Patented Apr. 4, 1944

2,346,034

UNITED STATES PATENT OFFICE 2,346,034

OPEN HEARTH CHARGING ORE

Hobart M. Kraner, Bethlehem, Pa., assignor to Bethlehem Steel Company, a corporation of Pennsylvania No Drawing. Original application June 14, 1941, Serial No. 398,063. Divided and this application March 24, 1942, Serial No. 436,023

3 Claims. (Cl. 75—3)

This application relates to a process and product of manufacture of iron ore blocks or bricks especially adapted for charging into a basic open hearth furnace, and is a division of my co-pending application Serial No. 398,063, filed June 14, 1941, now Patent No. 2,308,984, issued January 19, 1943, for Synthetic ores.

Almost all of the open hearth furnaces used in the United States in making steel are of the basic type, because most of the available pig iron contains a fairly high percentage of phosphorus which requires limestone or dolomite for its removal. The process is in brief as follows: Limestone is charged on a basic bottom, ore is charged on top of the stone, and scrap on top of this. This mass is heated for about two hours, or until the scrap is white hot and slightly fused, and a charge of molten pig iron is then added which completes the charge and begins the reaction proper.

The majority of iron ores which serve as charging ores in this process are simple oxides of iron, hematites, $Fe_2O_3$, or magnetites, $Fe_3O_4$, of varying degrees of purity in the natural state. Under ordinary conditions, most of the dense iron ores favored for the process have been imported from Sweden. The Swedish ores, which are chiefly magnetites, are not greatly higher in iron than the American hematites from the Lake Superior region, but have greatly preferable physical properties arising from their bulk. While not exclusively lump, the imported Swedish ores are very dense, usually mixtures of extremely large lumps with a percentage of fine material, while most of the domestic ores are soft and fine.

Foamy slags in the basic open hearth process act as insulators between the bath and the flame, thereby retarding heat absorption and causing great waste of time and fuel and possible overheating and damage to refractories. Foaming is produced by the formation of minute bubbles of carbon-monoxide gas at the slag-metal interface, and is much less prevalent with the coarser Swedish ores which offer less contact surface than with the powdery ores of domestic production. Under wartime conditions, however, Swedish ore is now almost unobtainable, and ways of using more available materials instead are imperatively necessary.

It is therefore an object of my invention to produce a lump iron ore from the fine ores which are plentiful in this country, and which may then be used for every purpose to which Swedish ores are adapted.

Another object of my invention is to produce a synthetic iron ore which will eliminate foaming when used in the basic open hearth furnace.

Another object is an ore which will permit large savings in open-hearth heat time and cost of fuel and refractories.

Another object is a reduction in cost of ore charges by allowing the substitution of an inexpensive domestic ore product for expensive imported ores.

Still another object is the production of iron ore bricks or blocks of uniform size and homogeneous texture which will give more predictable and consistent results in the basic open hearth furnace than conventional charging ores.

In the fine iron ores of the Lake Superior region about 10 to 15 per cent or more of free water and a small amount of chemical water are generally present in the natural state. By pressing the ore to approximately 2000 to 5000 pounds per square inch of pressure, in individual steel molds, with the natural water as the only binder, and firing to 2100° to 2300° F., or below the formation point of $Fe_3O_4$, in a gas-fired tunnel kiln or the like, I have produced an ore block or brick which has considerable strength and simulates lump ore except for its greater uniformity in shape, size, weight and texture. Blocks fired below 2100° F. have not sufficient strength to resist ordinary handling, and above 2300° F. the ore gives up part of its oxygen to form the magnetic oxide $Fe_3O_4$. A standard-sized ore brick 9 by 4½ by 3 inches is convenient to form and handle, and will weigh on an average about 11.6 pounds.

Especially suited to this process are the plastic Old Range ores known commercially as Beaver, Earl, Eureka, Harper, Osana and Plymouth, according to the names of the producing mines.

In my co-pending application Serial No. 398,063, filed June 14, 1941, now Patent No. 2,308,984, issued January 19, 1943, I have described a process and product of manufacture of synthetic ores with substantially similar objects, advantages and purposes as in my herein-described invention. No claim is made in this application to unpressed synthetic ores made by mixing the iron ore with lime and fusing, as such ores are claimed in my said co-pending application. Although I have described my present invention in considerable detail, however, I desire it to be clearly understood that I reserve the right to use such other substitutions, modifications, or equivalents thereof as are embraced within the scope and spirit of this invention, or as are pointed out in the appended claims.

Having thus described my invention, what I claim as new and useful and desire to secure by Letters Patent is:

1. An ore block consisting of a finely powdered hematite ore pressed in a mold at 2000 to 5000 pounds per square inch pressure, with its natural water as the only binder, and fired about 2100° F. to 2300° F.

2. An ore block composed of fine hematite ore having included natural water pressed to 2000 to 5000 pounds per square inch pressure and fired to a temperature between 2100° and 2300° F.

3. A process of manufacturing a basic open hearth charging block of fine hematite ore having about 10 to 15 per cent of natural water, which comprises power-pressing the ore in a steel mold or the like under 2000 to 5000 pounds per square inch pressure to form the block, utilizing only the water naturally present in the ore to bind the block, and firing to a temperature about 2100° F. to 2300° F. to dry and bond the block.

HOBART M. KRANER.